United States Patent [19]
Tachikawa et al.

[11] Patent Number: 5,268,776
[45] Date of Patent: Dec. 7, 1993

[54] SYSTEM FOR PARTIALLY ERASING THERMALLY WRITTEN LIQUID CRYSTAL ELEMENT

[75] Inventors: Makoto Tachikawa, Hitachi; Noboru Azusawa; Tadahiko Hashimoto, both of Katsuta; Kuniyuki Igari, Hitachi; Toru Ishikawa, Hitachiohta, all of Japan

[73] Assignee: Hitachi, Ltd., Tokyo, Japan

[21] Appl. No.: 22,875

[22] Filed: Feb. 25, 1993

Related U.S. Application Data

[63] Continuation of Ser. No. 821,869, Jan. 16, 1992, abandoned, which is a continuation of Ser. No. 708,010, May 23, 1991, abandoned, which is a continuation of Ser. No. 593,506, Oct. 4, 1990, abandoned, which is a continuation of Ser. No. 324,721, Mar. 17, 1989, abandoned.

[30] Foreign Application Priority Data

Aug. 18, 1988 [JP] Japan .................. 63-63342

[51] Int. Cl.$^5$ .............................................. G02F 1/133
[52] U.S. Cl. ........................................ 359/43; 359/40; 359/86; 345/10

[58] Field of Search ............... 350/331 T, 331 R, 334, 350/351; 340/736, 786, 713; 859/43, 44, 45, 40, 86

[56] References Cited

U.S. PATENT DOCUMENTS

| | | | |
|---|---|---|---|
| 3,796,999 | 3/1974 | Kahn | 350/351 |
| 3,988,056 | 10/1976 | Hareng et al. | 350/351 |
| 4,031,529 | 6/1977 | Borel et al. | 350/351 |
| 4,499,458 | 2/1985 | Le Berre et al. | 340/713 |
| 4,696,550 | 9/1987 | Shionoya | 350/351 |

*Primary Examiner*—William L. Sikes
*Assistant Examiner*—Huy K. Mai
*Attorney, Agent, or Firm*—Antonelli, Terry, Stout & Kraus

[57] ABSTRACT

The liquid crystal is written with a laser beam. The laser beam generated by a laser source is applied through an optical control unit such as galvanometer mirrors to the liquid crystal. To erase a part of the data written in the previous time completely, the liquid crystal is irradiated with the laser beam slightly wider than the portion that was thermally written on the liquid crystal in the previous time.

4 Claims, 3 Drawing Sheets

SYSTEM FOR PARTIALLY ERASING THERMALLY WRITTEN LIQUID CRYSTAL ELEMENT

This application is a continuation of application Ser. No. 07/821,869, filed Jan. 16, 1992, now abandoned, which is a continuation of application Ser. No. 07/708,010, filed May 23, 1991, now abandoned, which is a continuation of application Ser. No. 07/593,506, filed Oct. 4, 1990, now abandoned, which is a continuation of application Ser. No. 07/324,721, filed Mar. 17, 1989, now abandoned.

BACKGROUND OF THE INVENTION

The present invention relates to a system for writing data onto the thermally writing-type liquid crystal elements used for display equipment, and more particularly to a write control system suited for partially erasing the screen.

In the liquid crystal projection-type display device, the data after having been written are partially erased by simply erasing (writing) a portion as disclosed in the U.S. Pat. No. 3,836,243, for example.

According to the above system, however, no consideration has been given to drift or change in the positioning precision of thermal writing using a laser beam or the like beam or to a change in the power of the laser beam, and no consideration has been given to temperature drift by the thermal writing means (e.g., device for determining focal point of laser beam) or to drift with the lapse of time. Therefore, when it is desired to erase a thermally written portion from a pattern on the liquid crystal on which the data have been written in the previous time, the data are not often sufficiently erased from such a portion.

SUMMARY

The object of the present invention is to provide a system for favorably erasing the thermally written portions, without involving the defects inherent in the prior art.

The above-mentioned object is achieved by thermally erasing a pattern that is slightly wider than a pattern that was thermally written on the liquid crystal elements in the previous time. Described below are concrete means for achieving the above object.

(1) When the data are to be partially erased, the power of thermal irradiation is increased more than when the data are to be written, such that the temperature is elevated over a slightly wider region. That is, the current of the laser diode is increased to increase the laser power.

(2) Positioning speed for thermal irradiation power is decreased for the same purpose as that of (1). Therefore, the thermal irradiation power increases per a unit time to obtain the same effects as those of (1).

(3) Adjust the focal distance of the f-θ lens to slightly increase the diameter of focal point of thermal power.

(4) Slightly increase the ambient temperature $T_0$ of the liquid crystal element when the data are to be partially erased.

(5) Slightly increase the voltage across the liquid crystal element electrodes to increase the sensitivity gain for the temperature of partial erasing.

(6) Erase the overlapped portion widely to some extent. That is, erase the area slightly wider than the area that was written in the previous time.

According to the above-mentioned means (1), (2) and (3), the power for thermal writing (erasing) is increased to erase the portion of a slightly wide area. According to the above-mentioned means (4) and (5), the gain of power for thermal erasing is increased and according to the means (6), a slightly wider area is partially erased in a software manner. The last method is practical though the erasing ability is limited by the resolution of the hardware.

DETAILED DESCRIPTION OF A PREFERRED EMBODIMENT

An embodiment of the invention will now be described in conjunction with the drawings.

Figure 1:
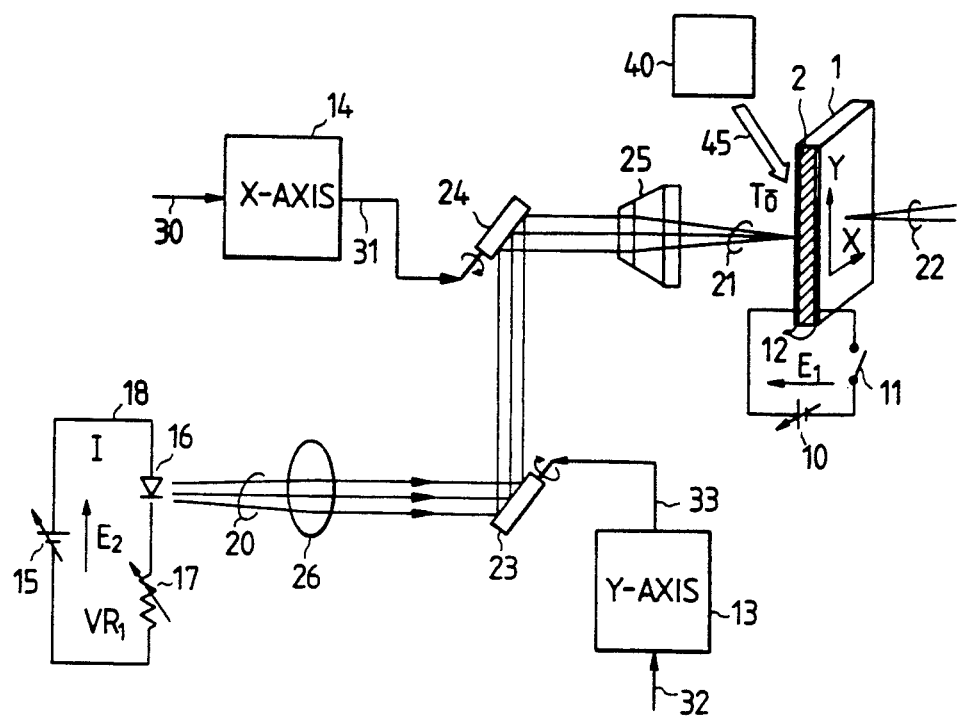
FIG. 1 is a diagram illustrating the whole structure of a liquid crystal projection device employed in an embodiment of the present invention.
Figure 2:
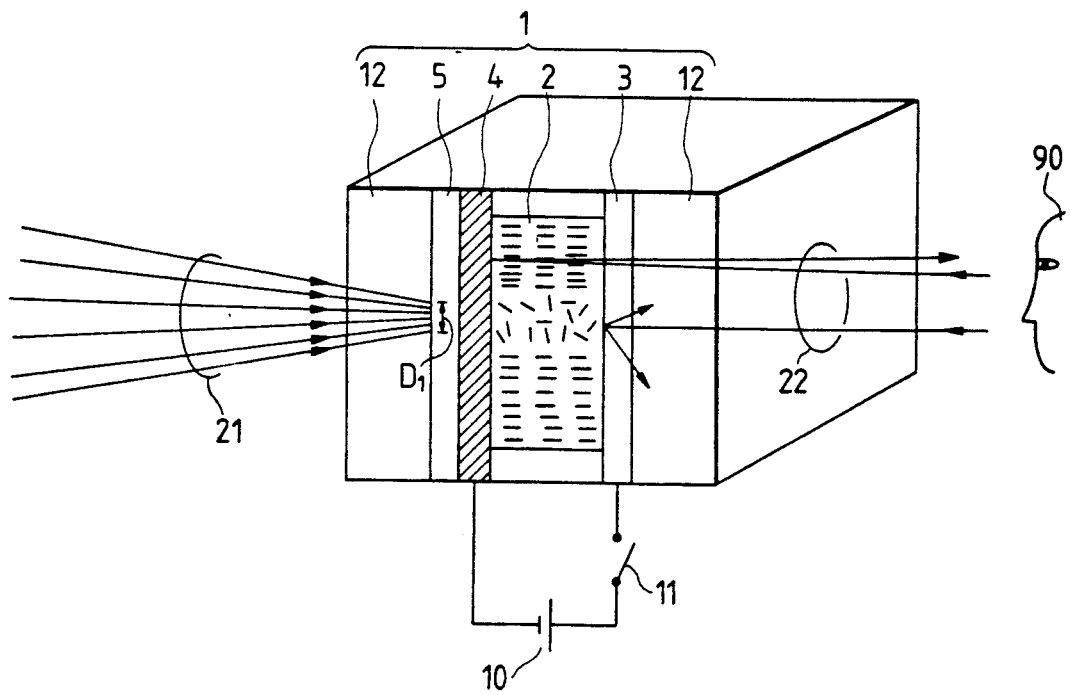
FIG. 2 is a sectional view of a liquid crystal element.
Figure 3:
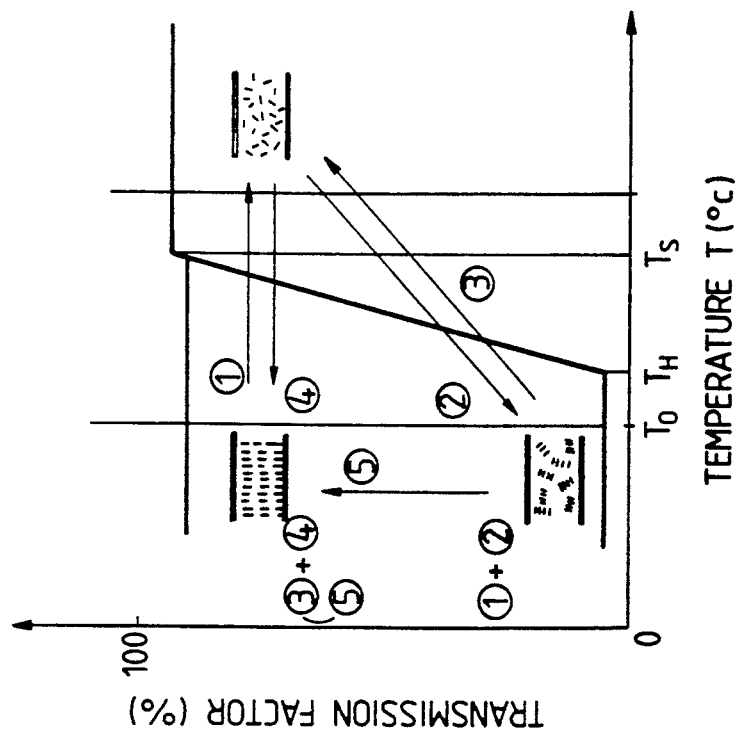
FIG. 3 is a diagram showing the thermal electro-optical characteristics of the liquid crystal.

FIG. 1 is a diagram illustrating the whole structure of a display equipment according to the present invention. The thermal writing onto a liquid crystal element 1, partial erasing and whole erasing will now be described with reference to FIG. 1 in conjunction with FIGS. 2 and 3. FIG. 2 is a sectional view of a liquid crystal element, and FIG. 3 is a diagram illustrating the thermal electro-optical characteristics of the liquid crystal element. In FIG. 1, the liquid crystal element 1 is maintained at a constant temperature $T_0$ owing to the fluid or air flow 45 of a predetermined temperature from a temperature controller 40.

A laser light 20 which represents an electromagnetic wave beam emitted from a semiconductor laser 16 as an electromagnetic wave generator arrives at the liquid crystal element 1 passing through a focusing lens 26, a Y-axis galvanomirror 23, an X-axis galvanomirror 24 and an f-θ lens 25. The focusing lens 26 works to transmit the laser light emitted from the semiconductor laser 16 (hereinafter referred to as LD) in parallel. The f-θ lens 25 which receives the parallel light works to bring the focal point of laser beam 21 on any point on the plane of liquid crystal. The Y-axis galvanomirror 23 (hereinafter referred to as GVMY) and the X-axis galvanomirror 24 (hereinafter referred to as GVMX) are driven by a Y-axis servo amplifier 13 and an X-axis servo amplifier 14, respectively.

The servo amplifiers have position control circuits and speed controllers, respectively, which receive positioning instructions 30, 32 and output signals to mirror drivers (not shown) for the movement of the GVMX and GVMY.

The laser light 20 oscillates up and down, and right and left due to GVMY and GVMX, and is applied to the liquid crystal element 1 as a laser heat.

Next, FIG. 2 illustrates the liquid crystal element in detail, FIG. 3 illustrates the temperature characteristics of the liquid crystal, and the operation of the liquid crystal element will now be described with reference to these drawings.

FIG. 2 is a sectional view showing the liquid crystal element 1 in detail (portions that are not directly related to the present invention are omitted). Concretely, the liquid crystal element of the present invention consists of a liquid crystal (smectic type) 2 that is sandwiched by glasses 12. Between the glasses 12 and the liquid crystal 2 are interposed a chromium oxide film 5 that converts the laser light into heat, an aluminum film 4 which reflects the external light 22 (which also serves as an electrode) and a transparent electrode 3 which constitutes another electrode.

The laser beam 21 is focused to the size of a given diameter $D_1$, falls on the chromium oxide layer and is converted into heat. The diameter $D_1$ usually ranges from several microns to several hundred microns, and the liquid crystal 2 over this range only is quickly heated and assumes the isotropic liquid condition at a temperature in excess of its transition temperature Ts. When the laser beam is no more irradiated, the heat is quickly absorbed by the periphery whereby the liquid crystal is quickly cooled to be lower than the holding temperature $T_H$ and assumes the scattered condition to irregularly reflect the external light 22. In the portions that are not irradiated with the laser beam, the external light 22 is reflected by the aluminum layer 4; i.e., the aluminum film can be seen by a man 90.

Transition of the condition will now be described with reference to FIG. 3 which shows temperature characteristics of the liquid crystal.

The liquid crystal is first impressed with a high voltage and stays under the transparent condition. The liquid crystal passes through the heating ①by the laser beam and the cooling ②, and assumes the scattered condition ①+② after the writing. A high voltage is applied to reset the whole liquid crystal element to entirely erase the data (entirely transparent) ⑤. A given portion only is erased under the condition where the data have been written, i.e., the so-called partial erasing is effected, by heating the liquid crystal by the irradiation with a laser beam (in this case, a low voltage may be kept applied), turning the switch 11 of FIG. 1 on to apply a low voltage, and by cooling the liquid crystal ③, ④. Only the portion treated by this operation returns back to the transparent condition to effect the partial erasing.

To partially erase the figures, characters and symbols that were written in the previous time, the laser beam must be positioned quite in the same manner as that of the previous time. This is because, if the portion same as the portion which is the written in the previous time is not heated by heating ③, the thermal electro-optical characteristics of the liquid crystal shown in FIG. 3 are not satisfied. In FIG. 1, it is virtually impossible to perfectly trace the same portion as the one written in the previous time by maintaining a perfect positioning precision of the servo amplifiers 13 and 14 that determine the positions of the X-axis and Y-axis galvanomirrors 23 and 24.

The present invention provides a partially erasing method which compensates the incompleteness of the positioning devices 13 and 14 of FIG. 1.

Figure 4:
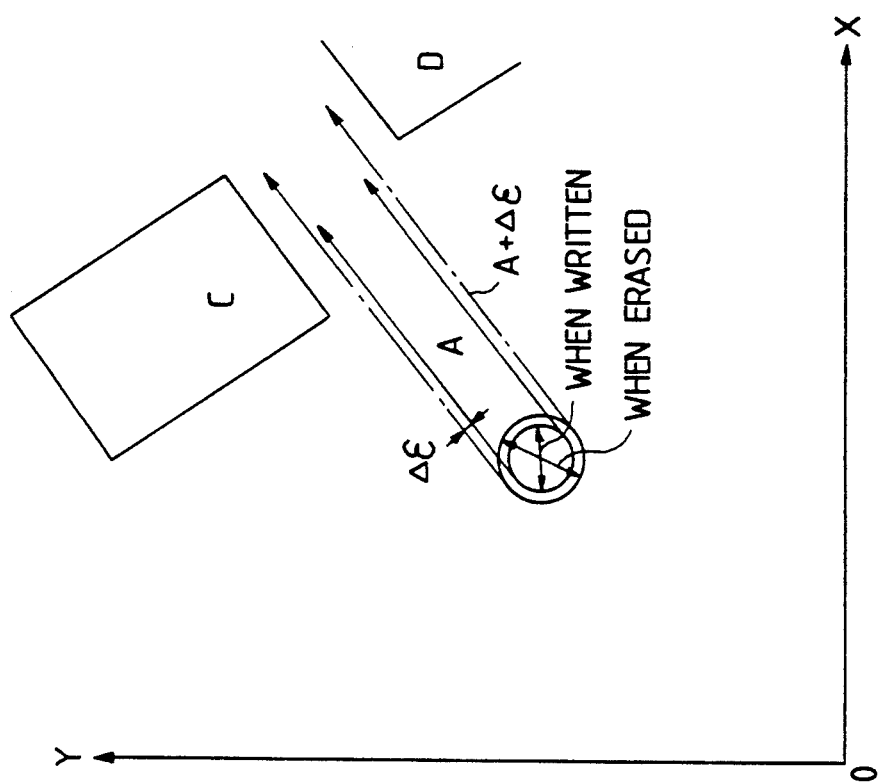
FIGS. 4 to 6 are diagrams showing patterns for effecting partial erasing.

FIG. 4 illustrates a general concept thereof which is intended to erase a portion $A+\Delta\epsilon$ that is slightly wider than a pattern A that was written in the previous time. The partial erasing does not erase the portions C and D near the pattern A, as a matter of course.

The value $\Delta\epsilon$ is selected to be greater than the precision value of the positioning servos 13 and 14. Concrete examples are as described below.

(1) Power (light emitting quantity) of the laser beam 21 is increased by about 30%, e.g., from 30 mW to 40 mW. This causes the heating temperature of the liquid crystal to rise and whereby the area slightly increases that exceeds the transition temperature Ts of liquid crystal of FIG. 3.

To increase the power of laser beam 21, the electric current 18 should be increased by decreasing the value of a variable resistor 17 ($VR_1$) or by increasing the power source voltage 15E in FIG. 1. The value $\Delta\epsilon$ can be determined by adjusting the electric current. This method is realized by a relatively simple means.

(2) The same object as (1) above can be achieved by slowing down the vibration speed of the X-axis and Y-axis galvanomirrors GVMX and GVMY. This is because, the change in temperature of the liquid crystal varies depending upon the power of laser beam and the application time thereof, i.e., the energy. In (1) above, the power of laser beam was controlled. However, the area of the liquid crystal that exceeds the transition temperature Ts can be increased even by slowing down the vibration speed of GVMX and GVMY.

To decrease the speed, the speed setting values of the galvanoamplifiers 14 and 13 are decreased that control GVMX and GVMY. The amount of reduction is about 30%, e.g., from 10 m/sec to 7 m/sec.

(3) The diameter of focal point of the laser beam (diameter of the beam incident upon the surface of chromium oxide film) is increased by about 10%. This is a directly effective method. For example, the object can be achieved by adjusting the focal distance of the f-θ lens 25 or by changing the spatial position of the liquid crystal element (the laser beam diameter is increased to become nearly equal to $\Delta\epsilon$). That is, the position of focal point is deviated or the beam is not focused. In this case, however, the power of the laser beam decreases per a unit area, and the methods (1) and (2) mentioned above should be employed in combination to obtain improved effects.

(4) The temperature of the liquid crystal element is slightly elevated at the time of partially writing the data. For example, the temperature which is usually maintained at 45° C. is raised to 47° C. This method makes it possible to obtain the effects same as those of (1). That is, if the temperature $T_0$ of the liquid crystal is raised, the area of the liquid crystal that exceeds the transition temperature Ts increases provided the power of the laser beam is constant. Concretely speaking, the whole liquid crystal element is heated or the vicinity of the partially erasing portion only is heated by using the temperature controller 40 of FIG. 1 or by using a separately provided optical system for heating.

(5) A voltage is increased across electrodes of the liquid crystal elements by about 50%, for example, from 20 V to 30 V. When the data are to be partially erased, a low voltage is applied across electrodes of the liquid crystal elements. By slightly raising the value of the low voltage, however, the transition temperature Ts of the liquid crystal can be equivalently decreased to obtain the same effects as those of (1).

(6) The length of light path of the optical system is changed. For example, a glass plate and, particularly, a lead glass plate having a large index of refraction is interposed in the light path when the data are to be partially erased, such that the length of light path changes and that the position of focal point changes. This makes it possible to obtain the effects same as those of (3) described above. In order to change the length of light path, the substance such as the glass plate is disposed at a position between the f-θ lens 25 and the liquid crystal element.

(7) Use is made of an acoustooptic deflector. This is an optical deflector based on the acoustooptic effect, utilizing the fact that the angle of diffraction in the primary diffracted light in the Bragg diffraction or in the Debye-Sears effect varies nearly in proportion to the frequency of ultrasonic waves. Using this deflector, the frequency of ultrasonic waves is modulated to deflect the light.

(8) Fine vibration is imparted to the laser light for partial erasing so that the region of incidence on the liquid crystal element will have a predetermined width (dither). This is accomplished by finely vibrating, for example, the galvanomirrors maintaining a predetermined period and width.

(9) Irradiation is effected for partial erasing being superposed slightly widely (Δε). In this method, positioning instructions 30 and 32 for the X-axis and Y-axis galvanoamplifies 14 and 13 are given in such a manner that the erasing area becomes slightly larger than those of when writing the data.

Figure 5:
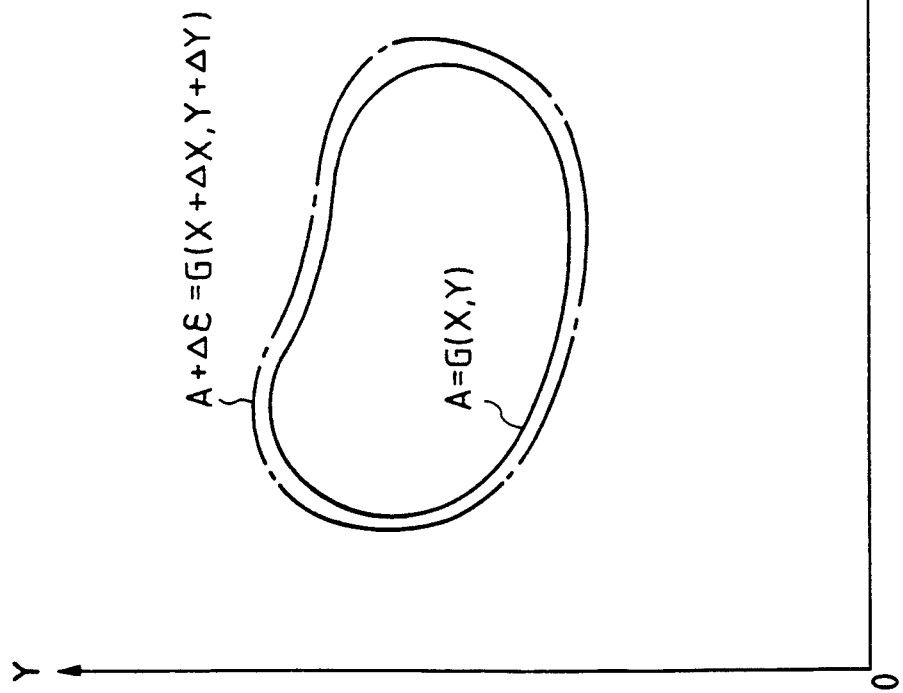

This method will now be explained in conjunction with FIGS. 5 and 6. FIG. 5 illustrates an example in which a portion of the written pattern A=G(X, Y) is entirely erased by the partial erasing, and satisfies the following equation, $$\Delta\epsilon = G(X+\Delta X, Y+\Delta Y) - G(X, Y) \qquad (1)$$

where Δε is 1, 2, 3, . . . , i times as great as a minimum positioning unit.

A software program for the positioning instructions can be easily prepared to satisfy the equation (1).

Figure 6:
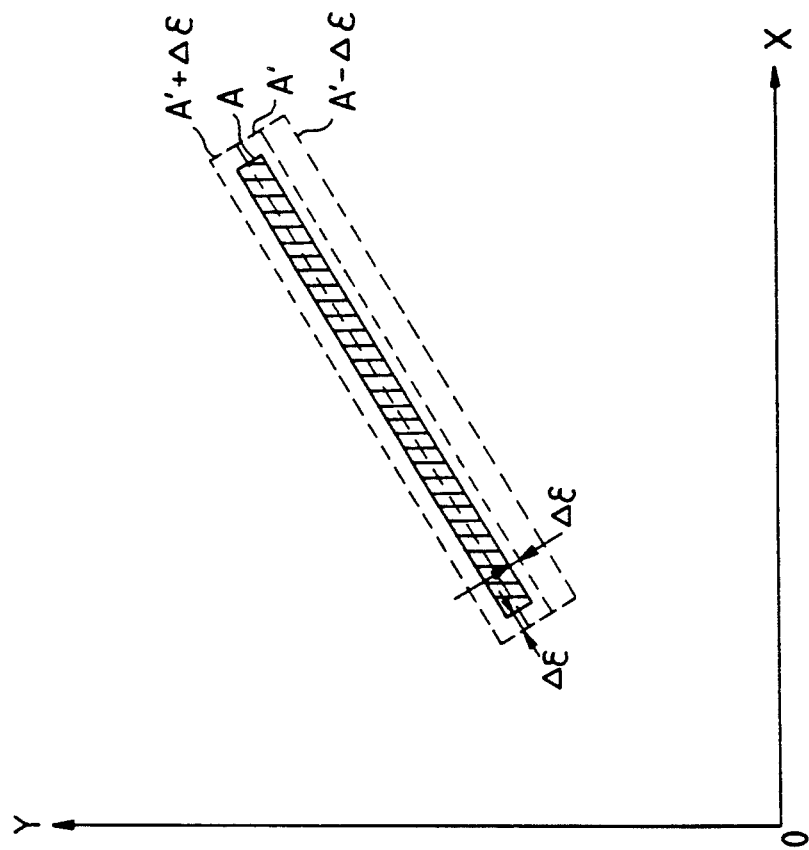

FIG. 6 illustrates an example of partial erasing after a straight line is drawn. In this example, the partial erasing is effected by writing three lines. One is the line A', and the other two are A'+Δε and A−Δε. The line can be erased even by writing two lines if the direction of Δε has been determined. Symbol A denotes a straight line that is written, and A' denotes partial erasing of which the position is deviated. The straight line A can be entirely erased by effecting the partial erasing over A'+Δε and A−Δε.

In FIG. 6, one line is erased by erasing three lines. Generally, however, n lines can be erased by erasing n+2 lines. N lines can be erased even by erasing n+1 lines provided the direction of Δε has been determined.

If generalized furthermore, when the deviation is to such an extent that Δε<k lines, then the n lines can be erased by erasing n+2k lines. If the direction of Δε has been determined, n lines can be erased by erasing n+k lines. With the program being prepared as described above, then the partial erasing can be effected completely.

According to this embodiment, the partial erasing can be effected perfectly with the positioning precision for the laser beam being suppressed within an economical range.

The embodiment of FIG. 2 has dealt with the liquid crystal element of the reflection type (external light 22 is reflected by the aluminum layer). The partial erasing, however, can be effected quite in the same manner even by using the liquid crystal element of the transmission type.

According to the present invention, the partial erasing can be effected perfectly even when the precision of the positioning servo is suppressed within an economical range, making it possible to prepare a perfect picture and to economically fabricate the apparatus.

What is claimed is:

1. A system for partially erasing a thermally written liquid crystal element of a projection-type display for thermally writing data by irradiating the liquid crystal element with a beam of electromagnetic waves generated by electromagnetic wave generating means, characterized in that a region on which the data are thermally written is selectively heated by applying the beam of electromagnetic waves thereto and stopping the application so as to permit said region to cool wherein the selecting means includes means for changing a light path of the beam of electromagnetic waves depending upon when the data are to be thermally written and when the data are to be thermally erased wherein the heating region for thermally erasing the data is selected to be greater than the heating region for thermally writing the data.

2. A system for partially erasing a thermally written liquid crystal according to claim 1, wherein the light path changing means include optical axis control means relying upon mechanical displacement.

3. A system for partially erasing a thermally written liquid crystal element of a projection-type display for thermally writing data by irradiating the liquid crystal element with a beam of electromagnetic waves generated by electromagnetic wave generating means, characterized in that a region on which the data are thermally written is selectively heated by applying the beam of electromagnetic waves thereto and stopping the application so as to permit said region to cool, wherein the selecting means includes an optical system for focusing the beam of electromagnetic waves onto the liquid crystal element and for changing the focusing depending upon when the data are thermally written or when the data are thermally erased.

4. A system for partially erasing a thermally written liquid crystal element of a projection-type display for thermally writing data by irradiating the liquid crystal element with a beam of electromagnetic waves generated by electromagnetic wave generating means, characterized in that a region on which the data are thermally written is selectively heated by applying the beam of electromagnetic waves thereto and stopping the application so as to permit said region to cool, wherein the selecting means includes means for changing the temperature of said liquid crystal element depending upon when the data are thermally written or when the data are thermally erased.

* * * * *